United States Patent
Yoon

(10) Patent No.: US 11,916,254 B2
(45) Date of Patent: Feb. 27, 2024

(54) BATTERY PACK HAVING STRUCTURE CAPABLE OF PREVENTING OVERCHARGE, AND VEHICLE COMPRISING SAME

(71) Applicant: LG CHEM, LTD., Seoul (KR)

(72) Inventor: Seo-Young Yoon, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 718 days.

(21) Appl. No.: 17/047,338

(22) PCT Filed: Oct. 23, 2019

(86) PCT No.: PCT/KR2019/014009
§ 371 (c)(1),
(2) Date: Oct. 13, 2020

(87) PCT Pub. No.: WO2020/101208
PCT Pub. Date: May 22, 2020

(65) Prior Publication Data
US 2021/0184319 A1  Jun. 17, 2021

(30) Foreign Application Priority Data
Nov. 12, 2018  (KR) ........................ 10-2018-0138451

(51) Int. Cl.
*H01M 50/503* (2021.01)
*H01M 10/48* (2006.01)
(Continued)

(52) U.S. Cl.
CPC ......... *H01M 50/503* (2021.01); *H01M 10/48* (2013.01); *H01M 10/482* (2013.01);
(Continued)

(58) Field of Classification Search
CPC .. H01M 50/503; H01M 10/48; H01M 10/482; H01M 50/209; H01M 50/211;
(Continued)

(56) References Cited

U.S. PATENT DOCUMENTS

| 6,341,406 | B1 | 1/2002 | Uchida |
| 6,377,432 | B1 | 4/2002 | Hashimoto |

(Continued)

FOREIGN PATENT DOCUMENTS

| DE | 102014200197 | * 7/2015 | ............. H01M 2/34 |
| DE | 102014200197 A1 | 7/2015 | |

(Continued)

OTHER PUBLICATIONS

International Search Report for PCT/KR2019/014009 (PCT/ISA/210) dated Feb. 21, 2020.
European Search Report for 19884279.1 dated Jul. 20, 2021.

*Primary Examiner* — Michael L Dignan
(74) *Attorney, Agent, or Firm* — Birch, Stewart, Kolasch & Birch, LLP

(57) ABSTRACT

A battery pack includes a battery module assembly including a first battery module and a second battery module; a first connector connected to a first electrode of the first battery module; a second connector connected to a second electrode of the second battery module and spaced apart from the first connector; a switch configured to connect the first connector and the second connector; a current blocking member connected to one side of the switch in a longitudinal direction and configured to turn off the switch by causing a bending deformation when a potential difference formed between both electrodes of the battery module is equal to or greater than a reference value.

12 Claims, 4 Drawing Sheets

(51) Int. Cl.
  *H01M 50/209* (2021.01)
  *H01M 50/211* (2021.01)
  *H01M 50/50* (2021.01)
  *H01M 50/583* (2021.01)

(52) U.S. Cl.
  CPC ....... *H01M 50/209* (2021.01); *H01M 50/211* (2021.01); *H01M 50/50* (2021.01); *H01M 50/583* (2021.01); *H01M 2220/20* (2013.01)

(58) Field of Classification Search
  CPC .............. H01M 50/50; H01M 50/583; H01M 2220/20; H01M 2200/00; H01M 50/572; B60L 3/0046; B60L 50/64; B60L 3/04; B60L 58/10; Y02E 60/10; Y02T 10/70; H01H 57/00
  See application file for complete search history.

(56) References Cited

U.S. PATENT DOCUMENTS

| | | | |
|---|---|---|---|
| 6,448,883 B1 * | 9/2002 | Hofsass | H01H 1/50 337/342 |
| 8,958,196 B2 * | 2/2015 | Takeda | H01H 1/504 361/124 |
| 2005/0162049 A1 | 7/2005 | Krill | |
| 2006/0275653 A1 * | 12/2006 | Chang | H01M 50/574 337/16 |
| 2008/0086081 A1 | 4/2008 | Eidenschink et al. | |
| 2008/0170936 A1 | 7/2008 | Den Toonder et al. | |
| 2009/0139781 A1 * | 6/2009 | Straubel | B60L 53/14 701/22 |
| 2010/0171393 A1 | 7/2010 | Pei et al. | |
| 2011/0199056 A1 | 8/2011 | Pinto, IV et al. | |
| 2014/0212719 A1 | 7/2014 | Kwon et al. | |
| 2016/0035521 A1 * | 2/2016 | Namikawa | H01H 37/5427 337/380 |
| 2016/0216492 A1 | 7/2016 | Yun et al. | |
| 2017/0047589 A1 | 2/2017 | Saks et al. | |
| 2017/0179462 A1 | 6/2017 | Bourns et al. | |
| 2017/0333223 A1 | 11/2017 | Rasmussen et al. | |
| 2018/0198053 A1 * | 7/2018 | Doyle | H10N 30/857 |
| 2019/0237651 A1 * | 8/2019 | Van Den Ende | H10N 30/802 |

FOREIGN PATENT DOCUMENTS

| | | | | |
|---|---|---|---|---|
| DE | 102016222142 | * | 5/2018 | ............. H01M 2/20 |
| DE | 102016222142 A1 | | 5/2018 | |
| JP | 2000-207985 A | | 7/2000 | |
| JP | 2002-95157 A | | 3/2002 | |
| JP | 2003-223886 A | | 8/2003 | |
| JP | 2008-535669 A | | 9/2008 | |
| JP | 2014-532277 A | | 12/2014 | |
| JP | 2015-207419 A | | 11/2015 | |
| JP | 2018-37327 A | | 3/2018 | |
| KR | 10-2010-0101948 A | | 9/2010 | |
| KR | 10-2015-0115402 A | | 10/2015 | |
| KR | 10-2018-0006412 A | | 1/2016 | |
| KR | 10-2018-0091446 A | | 8/2018 | |
| WO | WO 2018/002177 A1 | | 1/2018 | |

* cited by examiner

BATTERY PACK HAVING STRUCTURE CAPABLE OF PREVENTING OVERCHARGE, AND VEHICLE COMPRISING SAME

TECHNICAL FIELD

The present disclosure relates to a battery pack having a structure capable of preventing overcharging and a vehicle including the battery pack, and more particularly to, a battery pack including a current blocking member capable of blocking a current between battery modules electrically connected to each other by changing a shape of the current blocking member according to a potential difference applied between both surfaces and a vehicle including the battery pack.

The present application claims priority to Korean Patent Application No. 10-2018-0138451 filed on Nov. 12, 2018 in the Republic of Korea, the disclosures of which are incorporated herein by reference.

BACKGROUND ART

Fuse devices which are currently used in secondary batteries include a positive temperature coefficient (PTC) thermistor, a thermal cut-out (TCO), a thermal fuse, etc. However, in the case of the thermal fuse, there is a disadvantage of one-time use, and although the PTC thermistor or the TCO is repeatedly usable, there is a disadvantage that the resistance thereof increases as the operation is repeated, which increases the overall resistance on the circuit.

In addition, all of the above-mentioned devices operate by heat generated by an overcurrent. That is, the above-mentioned devices correspond to devices that operate to block the flow of a current when the overcurrent is generated on a circuit current path due to overcharging, etc., and thus the temperature increases.

Therefore, in the case of the above-mentioned devices, it is possible to block the overcurrent by operating after a situation where safety may be threatened due to the heat, and it is impossible to block the overcurrent immediately when a cause for increasing the temperature occurs.

In addition, in the case of the above-mentioned devices, since the devices operate simply according to the temperature, it is difficult to use the devices in a secondary battery exhibiting a high output such as a battery pack used in a vehicle. In other words, in the case of a vehicle battery pack, a high c-rate is required, which also accordingly requires a large amount of heat. There is a problem in that the devices such as the PTC thermistor, the TCO, and the thermal fuse operate too early when placed in such a high temperature environment.

Therefore, there is a need for a secondary battery to which a device that is reusable and is usable even in an environment where a high current flows, and is capable of previously blocking the current when an event that may cause such a temperature rise occurs before the temperature rises is applied.

DISCLOSURE

Technical Problem

The present disclosure is designed to solve the problems of the related art, and therefore the present disclosure is directed to providing a battery pack having a structure in which a current blocking member capable of previously blocking a current before the temperature of the battery pack rises by heat generated due to overcharging of the battery pack, etc. is installed.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a battery pack including a battery module assembly including a first battery module and a second battery module; a first connector connected to a first electrode of the first battery module; a second connector connected to a second electrode of the second battery module and spaced apart from the first connector; a switch configured to connect the first connector and the second connector; a current blocking member connected to one side of the switch in a longitudinal direction and configured to turn off the switch by causing a bending deformation when a potential difference formed between electrodes of one of the battery modules is equal to or greater than a reference value.

Each battery module may include a plurality of battery cells electrically connected to each other.

A first side of the switch in the longitudinal direction may be formed as a free end to be in contact with the first connector and to release a contact state between the switch and the first connector by the bending deformation of the current blocking member, and a second side of the switch in the longitudinal direction may be formed as a fixed end fixed to the second connector.

A first side of the current blocking member in the longitudinal direction may be a free end having a position which is changeable by the bending deformation, and a second side of the current blocking member may be a fixed end directly or indirectly connected to the second battery module or a ground.

The current blocking member may include an electro active polymer (EAP) layer; a first metal layer formed on a first side of the EAP layer; and a second metal layer formed on a second side of the EAP layer.

The EAP layer may include at least one polymer electrolyte selected from Nafion, polypyrrole, polyaniline and polythiophene.

The first metal layer and the second metal layer may include at least one metal selected from the group comprising platinum, silver and copper.

The first metal layer may be electrically connected to a negative electrode of the second battery module, and the second metal layer may be electrically connected to a positive electrode of the second battery module.

The current blocking member may be located above the switch, and the first metal layer may face the switch.

The battery pack may further include a connecting rod configured to connect between the switch and the first metal layer, the connecting rod having non-conductivity.

The connecting rod may be hinged to each of the switch and the first metal layer.

In another aspect of the present disclosure, there is provided a vehicle including the battery pack as described above.

Advantageous Effects

According to an aspect of the present disclosure, in the use of a battery pack, before an event such as overheating and/or explosion of the battery pack due to overcharging of the battery pack, etc. occurs, a current may be blocked by previously detecting a potential difference equal to or greater than a reference value that causes occurrence of the event, thereby securing safety in the use of the battery pack.

MODE FOR DISCLOSURE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

First, referring to FIGS. 1 to 5, the overall configuration of a battery pack according to an embodiment of the present disclosure will be described.

Figure 1:
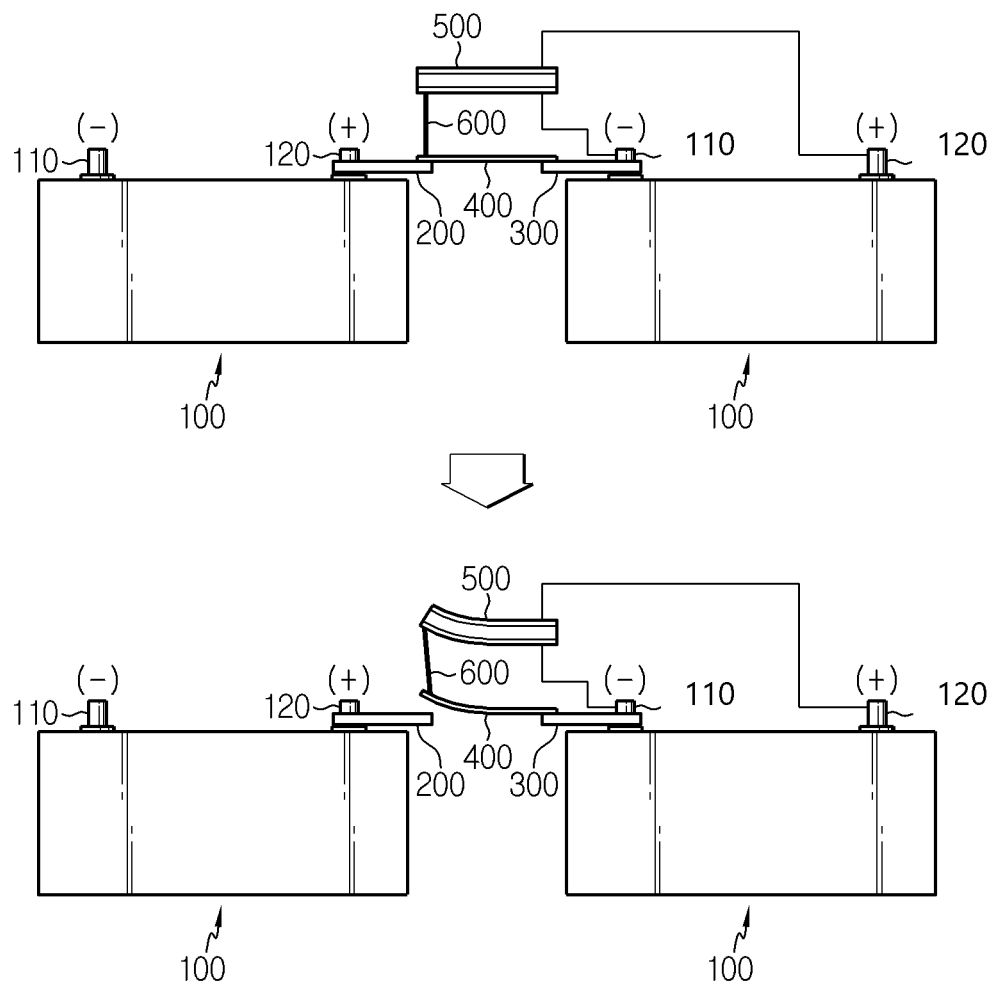
FIG. 1 is a diagram showing a battery pack according to an embodiment of the present disclosure.
Figure 2:
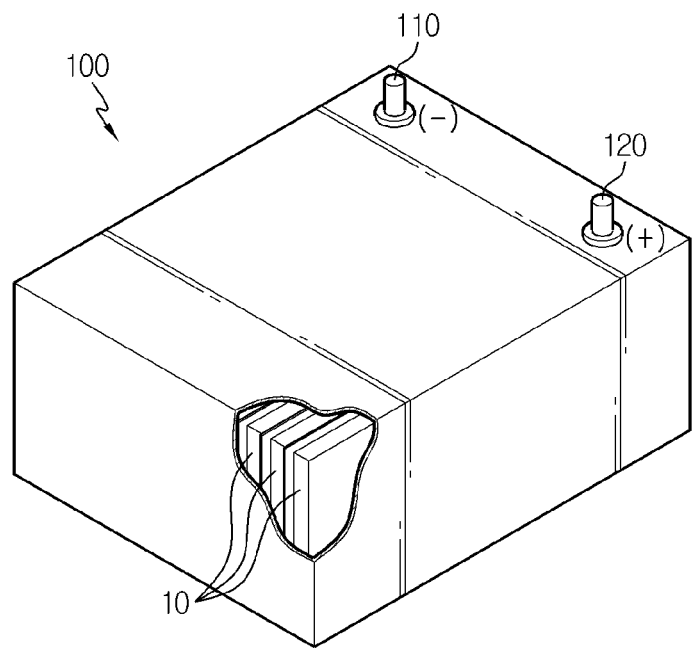
FIG. 2 is a diagram showing an individual battery module included in the battery pack shown in FIG. 1.
Figure 3:
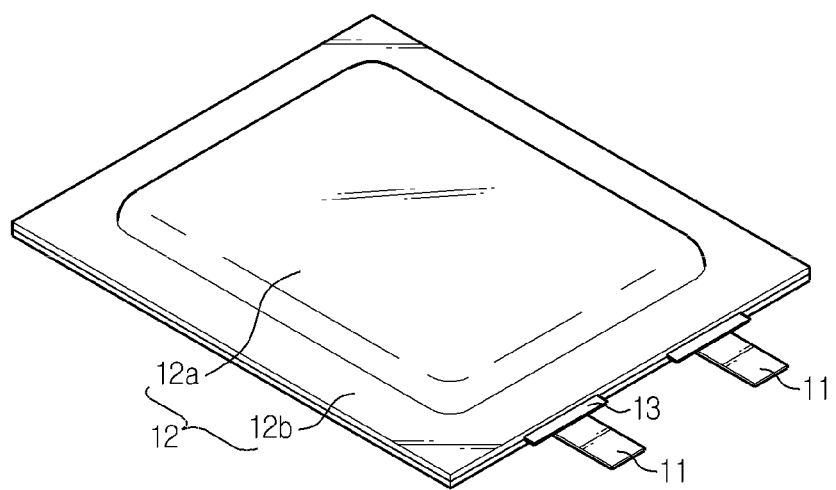
FIG. 3 is a diagram showing an individual battery cell included in the battery module shown in FIG. 2.
Figure 4:
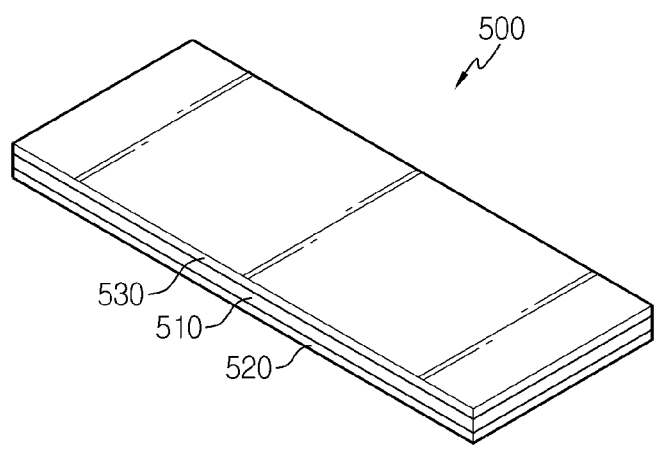
FIG. 4 is a diagram showing a current blocking member applied to the battery pack shown in FIG. 1.
Figure 5:
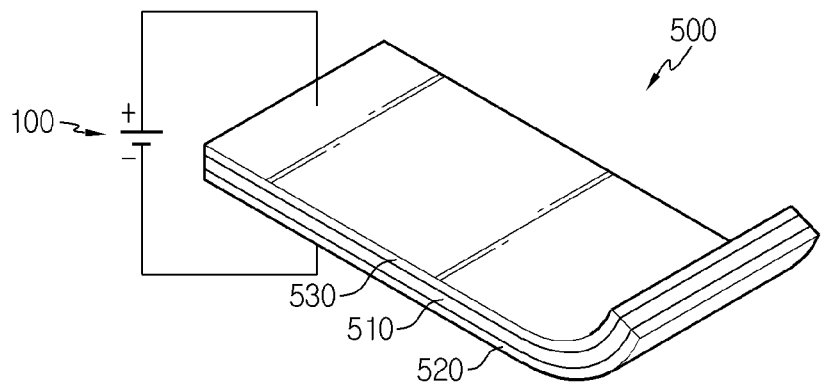
FIG. 5 is a diagram showing a shape deformation of the current blocking member when a potential difference equal to or greater than a reference value is formed between a first metal layer and a second metal layer of the current blocking member shown in FIG. 4.

FIG. 1 is a diagram showing a battery pack according to an embodiment of the present disclosure. FIG. 2 is a diagram showing an individual battery module included in the battery pack shown in FIG. 1. FIG. 3 is a diagram showing an individual battery cell included in the battery module shown in FIG. 2. Also, FIG. 4 is a diagram showing a current blocking member applied to the battery pack shown in FIG. 1. FIG. 5 is a diagram showing a shape deformation of the current blocking member when a potential difference equal to or greater than a reference value is formed between a first metal layer and a second metal layer of the current blocking member shown in FIG. 4.

First, referring to FIG. 1, the battery pack according to an embodiment of the present disclosure includes a plurality of battery modules 100, a first connector 200, a second connector 300, a switch 400, a current blocking member 500, and a connecting rod 600.

Referring to FIGS. 1 and 2 together, the plurality of battery modules 100 forms one battery module assembly electrically connected to each other. The battery module 100 may include a plurality of battery cells 10 connected in series, in parallel, or a mixture of series and parallel with each other. In addition, a cell stack formed by electrically connecting the battery cells 10 may be electrically connected to a first electrode terminal 110 and a second electrode terminal 120 that are formed in outside of the battery module 100.

In the drawings of the present disclosure, a case where the first electrode terminal 110 is a negative electrode terminal and the second electrode terminal 120 is a positive electrode terminal is shown as an example, but the present disclosure is not limited thereto, and a case where the first electrode terminal 110 is a positive electrode terminal and the second electrode terminal 120 is a negative electrode terminal may be possible.

Referring to FIG. 3, as each of the battery cells 10 included in the battery pack, for example, a pouch type battery cell may be applied. Referring to FIG. 3, the pouch type battery cell 10 may include an electrode assembly (not shown), an electrode lead 11, a cell case 12, and a sealing tape 13.

Although not shown in the drawings, the electrode assembly has a structure in which separators are interposed between positive electrode plates and negative electrode plates that are alternately and repeatedly stacked, and the separators may be positioned on both outermost sides for insulation.

The negative electrode plate includes a negative electrode current collector and a negative electrode active material layer coated on one surface or both surfaces thereof, and at one end thereof, a negative electrode non-coating portion which is not coated with a negative electrode active material is formed and a negative electrode non-coating region functions as a negative electrode tab.

The positive electrode plate includes a positive electrode current collector and a positive electrode active material layer coated on one surface or both surfaces thereof, and at one end thereof, a positive electrode non-coating portion which is not coated with a positive electrode active material is formed and a positive electrode non-coating region functions as a positive electrode tab.

In addition, the separator is interposed between the negative electrode plate and the positive electrode plate to prevent direct contact between the electrode plates having different polarities and may be formed of a porous material to enable the movement of ions by using an electrolyte as a medium between the negative electrode plate and the positive electrode plate.

The electrode lead 11 is connected to the electrode tab and is withdrawn to the outside of the cell case 12. The battery cells 10 adjacent to each other may be electrically connected in series, parallel, or a mixture of series and parallel through the electrode lead 11 to form a single cell stack.

The cell case 12 includes two regions of an accommodation portion 12a that accommodates the electrode assembly and a sealing portion 12b that extends in the circumferential direction of the accommodation portion 12a and is thermally fused in a state where the electrode lead 11 is withdrawn to seal the cell case 12.

Although not shown in the drawings, the cell case 12 is sealed by contacting and thermally fusing edges of an upper case and a lower case configured as a multilayer pouch film in which a resin layer/metal layer/resin layer are sequentially stacked.

The sealing tape 13 is attached to the circumference of the electrode lead 11 and is interposed between the sealing portion 12b of the cell case 12 and the electrode lead 11. The sealing tape 13 is a component for preventing the degradation of sealing property of the cell case 12 due to a low adhesion force between the inner surface of the cell case 12 and the electrode lead 11 in a region in which the electrode lead 11 is withdrawn in the sealing portion 12b of the cell case 12.

Referring back to FIG. 1, the first connector 200 and the second connector 300 may have the shape of a metal plate of a conductive material. The first connector 200 is fastened to the second electrode terminal 120 of the first battery module 100 located on one side of a pair of battery modules 100 adjacent to each other. In addition, the second connector 300 is fastened to the first electrode terminal 110 of the second battery module 100 located on the other side of the pair of battery modules 100 adjacent to each other. The first connector 200 and the second connector 300 are spaced apart from each other by a predetermined distance.

The switch 400 connects a pair of connectors 200 and 300 spaced apart from each other. Specifically, the switch 400 may be installed to connect between upper surfaces of each of the first connector 200 and the second connector 300.

One side of the switch 400 in the longitudinal direction is formed as a free end which is in contact with the first connector 200 and moves together upon bending deformation of the current blocking member 500 such that a contact state between the switch 400 and the first connector 200 may be released. Unlike this, the other side of the switch 400 in the longitudinal direction is formed as a fixed end which is fixed to the second connector 300 by welding or the like.

The current blocking member 500 causes the bending deformation when voltage applied to both surfaces is equal to or greater than a reference value and is connected to the switch 400 by the connecting rod 600 to move the switch 400 to perform an off operation upon bending deformation.

In order to perform this function, the current blocking member 500 may be disposed above the switch 400. In addition, one side of the current blocking member 500 in the longitudinal direction may be formed as a free end of which position may change by the bending deformation, and the other side of the current blocking member 500 in the longitudinal direction may be formed as a fixed end fixed directly or indirectly to the battery module 100 or the ground.

In order to allow the switch 400 to perform the off operation by the bending deformation of the current blocking member 500, the connecting rod 600 connects the free end of the current blocking member 500 and the free end of the switch 400.

The connecting rod 600 may be formed of, for example, a plastic material, and both ends thereof may be attached to the lower surface of the current blocking member 500 and the upper surface of the switch 400, respectively.

Meanwhile, referring to FIGS. 4 and 5, in order to be able to block an overcurrent due to a shape deformation according to a potential difference formed between both surfaces, the current blocking member 500 may include an electro active polymer (EAP) layer 510, a first metal layer 520 formed on one side surface of the EAP layer 510, and a second metal layer 530 formed on the other side surface of the EAP layer 510.

The EAP layer 510, i.e., the electroactive polymer layer, corresponds to a layer formed of a polymer electrolyte having an excellent ion transfer property, and may include at least one polymer electrolyte selected from, for example, Nafion, polypyrole, polyaniline, and polythiophene.

The first metal layer 520 and the second metal layer 530 are formed on both surfaces of the EAP layer 510 and may be formed of a metal having excellent electrical conductivity. The metal layers 520 and 530 may include at least one metal selected from, for example, platinum (Pt), gold (Au), silver (Ag), and copper (Cu).

The current blocking member 500 causes the shape deformation when voltage equal to or greater than a reference value is applied through the metal layers 510 and 520 formed on both surfaces of the EAP layer 510.

That is, the first metal layer 520 is electrically connected to the negative electrode of the battery module 100, and the second metal layer 530 is electrically connected to the positive electrode of the battery module 100 such that a potential difference corresponding to the voltage of the battery module 100 is formed between the pair of metal layers 520 and 530.

When the potential difference formed between the pair of metal layers 520 and 530 as described above reaches a large numerical value exceeding a safety range considering the specification of the battery module 100 due to an issue such as overcharging, etc., mobility cations present inside the polymer electrolyte forming the EAP layer 510 move in the direction of the negatively charged first metal layer 520 while hydrated in water. In this case, an osmotic pressure is caused by an imbalance in the ion concentration between the first metal layer 520 and the second metal layer 530, which increases an amount of water molecules toward the negatively charged first metal layer 520, and thus the bending deformation occurs in the current blocking member 500 in the direction toward the second metal layer 530.

For such a shape deformation of the current blocking member 500 and a resulting operation of the switch 400, the first metal layer 520 faces the switch 400 and is connected to the negative electrode of the battery module 100, and the second metal layer 530 is connected to the positive electrode of the battery module 100 on the contrary thereto.

In addition, both ends of the connecting rod 600 are fixed to the first metal layer 520 and the switch 400, respectively, and are formed of a non-conductive material. This is because if the connecting rod 600 has conductivity, the first metal layer 520 is connected to both the positive electrode and the negative electrode of the battery module 100 such that the current blocking member 500 may cause the bending deformation.

Meanwhile, the magnitude of the voltage that may cause the shape deformation of the current blocking member 500 varies depending on the type of the polymer electrolyte constituting the EAP layer 510 applied to the current blocking member 500.

That is, the reference value of the voltage mentioned in the present specification may vary according to the type of the polymer electrolyte applied, and accordingly, a suitable polymer electrolyte may be selected according to the safety voltage range of each of the battery modules 100 constituting the battery pack to which the current blocking member 500 is applied, thereby quickly blocking the current when an event such as overcharging of the battery pack occurs.

Next, a modification of the connection structure of the current blocking member 500 and the switch 400 shown in FIG. 1 will be described with reference to FIG. 6.

Figure 6:
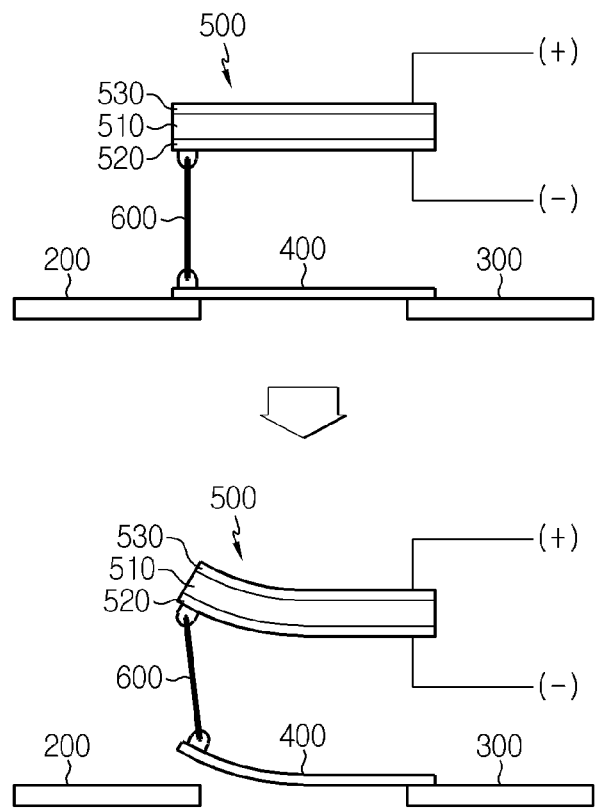
FIG. 6 is a diagram showing a modification of the connection structure of the current blocking member shown in FIG. 1 and a connecting plate.

FIG. 6 is a diagram showing a modification of the connection structure of the current blocking member 500 shown in FIG. 1 and a connecting plate.

Referring to FIG. 6, both ends of the connecting rod 600 may be hinged to the upper surface of the switch 400 and the first metal layer 520, respectively. As such, when the connecting rod 600 is hinged to the switch 400 and the current blocking member 500, a relative rotation between the switch 400, the current blocking member 500, and the connecting rod 600 is possible. Therefore, when a free end of the current blocking member 500 moves upward due to a bending deformation of the current blocking member 500, a free end of the switch 400 may also move upward smoothly without a shape deformation, such as bending, of the connecting rod 600.

As described above, the battery pack according to the present disclosure is configured to perform an on/off operation of the switch 400 that electrically connects between the battery modules 100 adjacent to each other by using the current blocking member 500 that causes the bending deformation according to the voltage of the battery module 100, thereby securing safety in the use of the battery pack.

Figure 7:
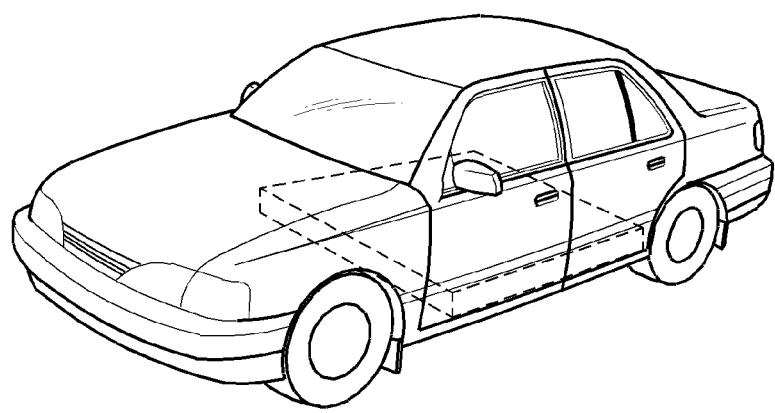
FIG. 7 is a diagram showing a vehicle according to an embodiment of the present disclosure.

Meanwhile, a vehicle according to an embodiment of the present disclosure shown in FIG. 7 includes the battery pack according to the present disclosure as described above.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

What is claimed is:

1. A battery pack comprising:
   a battery module assembly comprising a first battery module and a second battery module;
   a first connector connected to a first electrode of the first battery module;
   a second connector connected to a second electrode of the second battery module and spaced apart from the first connector;
   a switch configured to connect the first connector and the second connector;
   a current blocking member connected to one side of the switch in a longitudinal direction and configured to turn off the switch by causing a bending deformation when a potential difference formed between electrodes of one of the battery modules is equal to or greater than a reference value; and
   a connecting rod extending between the switch and current blocking member, the current blocking member being electrically isolated from the switch.

2. The battery pack of claim 1, wherein each battery module comprises a plurality of battery cells electrically connected to each other.

3. The battery pack of claim 1, wherein a first side of the switch in the longitudinal direction is formed as a free end to be in contact with the first connector and to release a contact state between the switch and the first connector by the bending deformation of the current blocking member, and
   wherein a second side of the switch in the longitudinal direction is formed as a fixed end fixed to the second connector.

4. The battery pack of claim 1, wherein a first side of the current blocking member in the longitudinal direction is a free end having a position which is changeable by the bending deformation, and
   wherein a second side of the current blocking member is a fixed end directly or indirectly fixed to the second battery module or a ground.

5. The battery pack of claim 1, wherein the current blocking member comprises:
   an electro active polymer (EAP) layer;
   a first metal layer formed on a first side surface of the EAP layer; and
   a second metal layer formed on a second side surface of the EAP layer.

6. The battery pack of claim 5, wherein the EAP layer comprises at least one polymer electrolyte selected from the group consisting of Nafion, polypyrrole, polyaniline and polythiophene.

7. The battery pack of claim 5, wherein the first metal layer and the second metal layer comprise a metal selected from the group comprising platinum, silver, and copper.

8. The battery pack of claim 5, wherein the first metal layer is electrically connected to a negative electrode of the second battery module, and
   wherein the second metal layer is electrically connected to a positive electrode of the second battery module.

9. The battery pack of claim 8, wherein the current blocking member is located above the switch, and
   wherein the first metal layer faces the switch.

10. The battery pack of claim 1, wherein the connecting rod is hinged to each of the switch and the current blocking member.

11. A vehicle comprising a battery pack according to claim 1.

12. The battery pack of claim 1, wherein the connecting rod is attached to a first end of the current blocking member, and
   wherein the first end of the current blocking member moves away from the switch to open the switch.

* * * * *